(12) United States Patent
Kapoor et al.

(10) Patent No.: US 11,062,217 B1
(45) Date of Patent: Jul. 13, 2021

(54) AIDS FOR PORTING PREDICTIVE MODELS ACROSS TENANTS AND HANDLING IMPACT OF SOURCE CHANGES ON PREDICTIVE MODELS

(71) Applicant: Numerify, Inc., San Jose, CA (US)

(72) Inventors: Rahul Kapoor, Bellevue, WA (US); Joseph Patrick Foley, Milwaukee, WI (US); Abhijeet Anant Joshi, Bangalore (IN)

(73) Assignee: Digital.ai Software, Inc., Burlington, MA (US)

( * ) Notice: Subject to any disclaimer, the term of this patent is extended or adjusted under 35 U.S.C. 154(b) by 684 days.

(21) Appl. No.: 15/992,992

(22) Filed: May 30, 2018

(51) Int. Cl.
    *G06N 5/04* (2006.01)

(52) U.S. Cl.
    CPC ..................... *G06N 5/04* (2013.01)

(58) Field of Classification Search
    None
    See application file for complete search history.

(56) References Cited

PUBLICATIONS

Oguntola, et al., SlimNets: An Exploration of Deep Model Compression and Acceleration, 2018 IEEE High Performance extreme Computing Conference (HPEC), 2018, pp. 1-6 (Year: 2018).*

Swingler, Learning and Searching Pseudo-Boolean Surrogate Functions from Small Samples, Evolutionary Computation, MIT Press, 2020, pp. 1-23 (Year: 2020).*

"Feature selection," Wikipedia, https://en.wikipedia.org/wiki/Feature_selection, Accessed May 18, 2018, 14 pages.

Guyon, I., et al., "An Introduction to Variable and Feature Selection," Journal of Machine Learning Research 3 (2003), pp. 1157-1182, Published Mar. 3, 2003.

"Feature Selection (Data Mining)," SQL Server Analysis Services, Microsoft, https://docs.microsoft.com/en-us/sql/analysis-services/data-mining/feature-selection-data-mining?view=sql-analysis-services-2017, Accessed May 18, 2018, 9 pages.

"Data Preparation Tools Platforms," Predictive analytics today, https://www.predictiveanalyticstoday.com/data-preparation-tools-and-platforms/, Accessed May 18, 2018, 25 pages.

* cited by examiner

Primary Examiner — Wilbert L Starks
(74) Attorney, Agent, or Firm — Rahman LLC

(57) ABSTRACT

An analytics server for scalable predictive analysis for analytics as a software service in multi-tenant environment is provided. The analytics server automatically validates portability of a predictive model from a first tenant to a second tenant by comparing value distribution of parameters between data inputs of the first tenant and the second tenant. The analytics server further automatically detects source data changes over a configurable time horizon as relevant to predictive model inputs, by comparing value distribution of parameters between two data inputs from a same tenant separated by a selected time horizon.

20 Claims, 8 Drawing Sheets

PORTING THE FIRST PREDICTIVE MODEL FOR THE SECOND TENANT BY AT LEAST ONE OF (A) REMOVING THE ONE OR MORE MISSING PARAMETERS, OR (B) INCORPORATING AT LEAST ONE OF (I) THE NEW PARAMETERS THAT ARE PRESENT IN THE SECOND INPUT DATA ON RECEIVING A FIRST INPUT FROM A USER BASED ON RESULTS OF INPUT DATA ANALYSIS OF THE NEW PARAMETERS, (II) THE PARAMETERS THAT ARE PRESENT IN THE FIRST PREDICTIVE ANALYSIS PARAMETERS AND IN THE SECOND INPUT DATA AND HAVE SIGNIFICANT CHANGES ON RECEIVING A SECOND INPUT FROM THE USER, OR (III) THE PARAMETERS THAT ARE PRESENT IN THE SECOND INPUT DATA AND ARE DISCARDED FROM THE FIRST PREDICTIVE ANALYSIS PARAMETERS AND HAVE SIGNIFICANT CHANGES ON RECEIVING A THIRD INPUT FROM THE USER, TO OBTAIN A TRANSFORMED SECOND PREDICTIVE MODEL FOR THE SECOND TENANT
612

ENABLING THE SECOND TENANT TO PERFORM PREDICTIVE ANALYSIS USING THE SECOND PREDICTIVE MODEL
614

FIG. 6B

AIDS FOR PORTING PREDICTIVE MODELS ACROSS TENANTS AND HANDLING IMPACT OF SOURCE CHANGES ON PREDICTIVE MODELS

BACKGROUND

Technical Field

The embodiments herein generally relate to scalable predictive analysis for analytics as a software service in a multi-tenant environment, and more specifically to a system and method for porting predictive models across tenants and handling impact of source changes on predictive models.

Description of the Related Art

For doing predictions based on large datasets, it is a challenge and cumbersome to identify a set of variables to be included as predictive variables as there may be hundreds of variables in the datasets. Existing solutions rely on intuition of data experts to select the variables manually from the datasets. Otherwise, a user or a data expert may feed the entire datasets to machine learning algorithms for identifying the relevant variables for analysis. A simplest algorithmic approach to identify the relevant variables from the dataset is to test each subset of variables and find the subset which minimizes the error rate. However, this approach is computationally very expensive. To increase the processing speed, the measuring of the error rate can be approximated by a simpler and computationally cheaper functions. Other solutions to the aforementioned problem include employing algorithms where the variable selection is embedded as part of the algorithm. Such algorithms may assign a weight to each variable and penalize and eliminate variables with low weights over successive iterations of the algorithms.

Further, it is very difficult and cumbersome for data experts to identify changes to the large datasets such as variables getting added, deleted or modified, and/or data distributions of existing variables changing over time effectively, and incorporate those changes in existing models. Another related problem in organizations offering predictive analytics software as a service is that the software may lack the ability to deploy a predictive model that is developed for one tenant using a business application, for another tenant who is using the same business application and modules, and even data in data sources is in the same schema as like the one for which the predictive model was developed. As used herein, the term tenant refers to a group of users sharing a common access with specific privileges to a particular software or instance of the software.

The problem is that even though two tenants may be using the same business application modules and data source, it is possible that the tenants may have individually customized the data source schemas according to their needs by using variables differently, by changing variables or by adding/removing variables. Further, the data distribution assumptions valid for the tenant for whom the model is originally developed may not hold for the tenant for whom the model is being ported. Therefore, traditionally such organizations rely on data scientists/experts to evaluate each tenant's data manually and make any required changes to a model developed for one tenant before deploying it for another tenant.

Accordingly, there remains a need for a system and method for porting a predictive model that is generated for one tenant to another tenant and to enable scalable predictive analysis for analytics as a software service in multi-tenant environment.

SUMMARY

In view of the foregoing, an embodiment herein provides an analytics server for scalable predictive analysis for analytics as a software service in multi-tenant environment. The analytics server includes a memory and a processor. The memory stores a set of instructions. The processor executes the set of instructions and is configured to (i) automatically obtain a first input data associated with a first tenant, (ii) determine first predictive analysis parameters associated with the first tenant by analyzing the first input data for selected entities, (iii) automatically read a computer-generated first predictive model with the first predictive analysis parameters associated with the first tenant and (iv) automatically compare one or more second parameters of a second input data associated with a second tenant with the first predictive analysis parameters. The second input data is obtained from at least one of a second tenant system or an application provider of the second tenant to (i) automatically determine (a) one or more missing parameters, from the first predictive analysis parameters, that are missing in the second input data, (b) one or more new parameters that are present in the second input data (c) one or more parameters that are present in the first predictive analysis parameters and in the second input data and (d) one or more parameters that are present in the second input data and are discarded from the first predictive analysis parameters, based on the comparison, (ii) port the computer-generated first predictive model for the second tenant by at least one of (a) removing the one or more missing parameters, or (b) incorporating at least one of (A) the new parameters that are present in the second input data on receiving a first input from a user based on results of input data analysis of the new parameters, (B) the parameters that are present in the first predictive analysis parameters and in the second input data and have significant changes on receiving a second input from the user, or (C) the parameters that are present in the second input data and are discarded from the first predictive analysis parameters and have significant changes on receiving a third input from the user, to obtain a transformed second predictive model for the second tenant and (iii) enable the second tenant to perform predictive analysis using the second predictive model. Data associated with at least one of (i) the parameters that are present in the first predictive analysis parameters and in the second input data and (ii) the parameters that are present in the second input data and are discarded from the first predictive analysis parameters are compared to determine whether the data distribution of the parameters has significant changes.

The first input data is obtained from at least one of a first tenant system or an application provider of the first tenant. The first input data includes metadata and data associated with the first tenant. The first predictive model that is run on a computer is generated by creating an input dataset for machine learning algorithm based on the first predictive analysis parameters.

In another embodiment, the processor is further configured to automatically determine at least one of source schema changes or data updates on the one or more first predictive analysis parameters over a period of time by comparing the first input data with a third input data associated with the first tenant, to refine the computer-generated first predictive model based on the third input data. The source schema changes are determined by identifying at least one of (a) one or more parameters, from the first predictive analysis parameters, that are missing in the third input data, (b) one or more new parameters that are present in the third input data, (c) one or more modified parameters or (d) one or more unchanged parameters that are present in the first input data and the third input data, based on the comparison of the first input data with the third input data. The one or more new parameters, the one or more modified parameters and the one or more unchanged parameters from the third input data are analyzed using data analysis techniques. Data associated with at least one of the one or more modified parameters or the one or more unchanged parameters are compared to determine whether the data distribution associated with the one or more modified parameters or the one or more unchanged parameters has significant changes. The data updates include changes to distribution of the first predictive analysis parameters or relationships among the first predictive analysis parameters over a configurable time horizon.

In yet another embodiment, the processor is configured to automatically refine the computer-generated first predictive model by incorporating the source schema changes and the data updates associated with the third input to obtain refined first predictive model for the first tenant. The incorporating of the source schema changes and the data updates include at least one of (a) removing the one or more missing parameters from the first predictive analysis parameters, or (b) incorporating, in the computer-generated first predictive model, at least one of (i) the one or more new parameters that are present in the third input data on receiving a fourth input from the user, (ii) the one or more modified parameters that have significant changes on receiving a fifth input from the user, or (iii) the one or more unchanged parameters that have significant changes on receiving a sixth input from the user.

The first input data and the second input data include data images obtained from the first tenant system and the second tenant system respectively. The first input data and the third input data include data images obtained from the first tenant system at different time periods.

In yet another embodiment, the first predictive analysis parameters associated with the first tenant are automatically determined by (i) implementing an input entity analysis technique to analyze the first input data and (ii) automatically analyzing the first input data for selected entities identified from the first input data. The first input data is analyzed to (a) identify entities and their relationships based on the metadata, (b) describe use of the entities based on available documentation or (c) identify frequently used entities based on usage logs for reports and ad-hoc queries.

The first predictive analysis parameters are determined by (a) implementing input data analysis techniques to analyze the first input data associated with selected entities to determine at least one of (i) a number and proportion of nulls or unspecified values for each parameter, (ii) a number and proportion of distinct values in each parameter, (iii) parameters with minimal or no variance in values, (iv) outliers for each parameters, (v) functional dependencies between the one or more first predictive analysis parameters within and across the entities, (vi) correlations between the one or more first predictive analysis parameters as determined using a standard statistical technique, (vii) categorical parameters with one or more category frequencies greater than a prespecified maximum percentage of observations or less than a prespecified minimum percentage of observations, (viii) a statistical distribution that matches actual parameter values along with support for under sampling or oversampling for adjustment of value distribution as required for numerical parameters, (ix) a minimum, a maximum, a median, a first quartile and a third quartile for the numerical parameters or (x) skewness for the numerical parameters, (b) automatically filtering parameters that have outliers from the first predictive analysis parameters and (c) automatically implementing user defined rules on the first predictive analysis parameters for at least one of (i) discarding of parameters which meet user defined criterion, (ii) filtering of data values for user specified parameters, (iii) replacing of data values for the first predictive analysis parameters, (iv) standardizing the data types and type specific derivations comprising at least one of (a) hour-of-day or (b) day-of-week for datetime types or reducing scale for the numerical parameters, (v) implementing a regular expression style transformation on the first predictive analysis parameters or concatenating parameters, (vi) performing numeric transformations, (vii) consolidating excessive number of categories or categories with very few observations for categorical parameters, (viii) skewness reducing transforms on the first predictive analysis parameters, (ix) performing transformations for modeling algorithms that are sensitive to variable scales comprising k-means or (x) extracting principal components for dimensionality reduction.

In yet another embodiment, the processor is further configured to automatically determine at least one of source schema changes or data updates on one or more second predictive analysis parameters associated with the second tenant over a period of time by comparing the second input data with a fourth input data associated with the second tenant, in order to refine the second predictive model based on the fourth input data. The second input data and the fourth input data comprise data images obtained from the second tenant system at different time periods.

In one aspect, a non-transitory computer readable storage medium storing a sequence of instructions, which when executed by a processor, performs a method for scalable predictive analysis for analytics as a software service in multi-tenant environment is provided. The method includes (i) automatically obtaining a first input data associated with a first tenant, (ii) determining first predictive analysis parameters associated with the first tenant by analyzing the first input data for selected entities, (iii) automatically reading a computer-generated first predictive model with the first predictive analysis parameters associated with the first tenant and (iv) automatically comparing one or more second parameters of a second input data associated with a second tenant with the first predictive analysis parameters. The second input data is obtained from at least one of a second tenant system or an application provider of the second tenant to (i) automatically determine (a) one or more missing parameters, from the first predictive analysis parameters, that are missing in the second input data, (b) one or more new parameters that are present in the second input data, (c) one or more parameters that are present in the first predictive analysis parameters and in the second input data and (d) one or more parameters that are present in the second input data and are discarded from the first predictive analysis parameters, based on the comparison, (ii) port the computer-generated first predictive model for the second tenant by at least one of (a) removing the one or more missing parameters, or (b) incorporating at least one of (A) the new parameters that are present in the second input data on receiving a first input from a user based on results of input data analysis of the new parameters, (B) the parameters that are present in the first predictive analysis parameters and in the second input data and have significant changes on receiving a second input from the user, or (C) the parameters that are present in the second input data and are discarded from the first predictive analysis parameters and have significant changes on receiving a third input from the user, to obtain a transformed second predictive model for the second tenant and (iii) enable the second tenant to perform predictive analysis using the second predictive model. Data associated with at least one of (i) the parameters that are present in the first predictive analysis parameters and in the second input data and (ii) the parameters that are present in the second input data and are discarded from the first predictive analysis parameters are compared to determine whether the data distribution of the parameters has significant changes.

The first input data is obtained from at least one of a first tenant system or an application provider of the first tenant. The first input data includes metadata and data associated with the first tenant. The first predictive model that is run on a computer is generated by creating an input dataset for machine learning algorithm based on the first predictive analysis parameters.

In another embodiment, the method includes the step of automatically determining at least one of source schema changes or data updates on the one or more first predictive analysis parameters over a period of time by comparing the first input data with a third input data associated with the first tenant, to refine the computer-generated first predictive model based on the third input data. The source schema changes are determined by identifying at least one of (a) one or more parameters, from the first predictive analysis parameters, that are missing in the third input data, (b) one or more new parameters that are present in the third input data, (c) one or more modified parameters or (d) one or more unchanged parameters that are present in the first input data and the third input data, based on the comparison of the first input data with the third input data. The one or more new parameters, the one or more modified parameters and the one or more unchanged parameters from the third input data are analyzed using data analysis techniques. Data associated with at least one of the one or more modified parameters or the one or more unchanged parameters are compared to determine whether the data distribution associated with the one or more modified parameters or the one or more unchanged parameters has significant changes. The data updates comprise changes to distribution of the first predictive analysis parameters or relationships among the first predictive analysis parameters over a configurable time horizon.

In yet another embodiment, the method further includes the step of automatically refining the computer-generated first predictive model by incorporating the source schema changes and the data updates associated with the third input to obtain refined first predictive model for the first tenant. The incorporating of the source schema changes and the data updates includes at least one of (a) removing the one or more missing parameters from the first predictive analysis parameters, or (b) incorporating, in the computer-generated first predictive model, at least one of (i) the one or more new parameters that are present in the third input data on receiving a fourth input from the user, (ii) the one or more modified parameters that have significant changes on receiving a fifth input from the user, or (iii) the one or more unchanged parameters that have significant changes on receiving a sixth input from the user.

The first input data and the second input data include data images obtained from the first tenant system and the second tenant system respectively. The first input data and the third input data include data images obtained from the first tenant system at different time periods.

In yet another embodiment, the first predictive analysis parameters associated with the first tenant are automatically determined by (i) implementing an input entity analysis technique to analyze the first input data and (ii) automatically analyzing the first input data for selected entities identified from the first input data. The first input data is analyzed to (a) identify entities and their relationships based on the metadata, (b) describe use of said entities based on available documentation or (c) identify frequently used entities based on usage logs for reports and ad-hoc queries.

The first predictive analysis parameters are determined by (a) implementing input data analysis techniques to analyze the first input data associated with selected entities to determine at least one of (i) a number and proportion of nulls or unspecified values for each parameter, (ii) a number and proportion of distinct values in each parameter, (iii) parameters with minimal or no variance in values, (iv) outliers for each parameters, (v) functional dependencies between said one or more first predictive analysis parameters within and across said entities, (vi) correlations between said one or more first predictive analysis parameters as determined using a standard statistical technique, (vii) categorical parameters with one or more category frequencies greater than a prespecified maximum percentage of observations or less than a prespecified minimum percentage of observations, (viii) a statistical distribution that matches actual parameter values along with support for under sampling or oversampling for adjustment of value distribution as required for numerical parameters, (ix) a minimum, a maximum, a median, a first quartile and a third quartile for said numerical parameters or (x) skewness for said numerical parameters, (b) automatically filtering parameters that have outliers from the first predictive analysis parameters and (c) automatically implementing user defined rules on the first predictive analysis parameters for at least one of (i) discarding of parameters which meet user defined criterion, (ii) filtering of data values for user specified parameters, (iii) replacing of data values for the first predictive analysis parameters, (iv) standardizing said data types and type specific derivations comprising at least one of (a) hour-of-day or (b) day-of-week for datetime types or reducing scale for said numerical parameters, (v) implementing a regular expression style transformation on the first predictive analysis parameters or concatenating parameters, (vi) performing numeric transformations, (vii) consolidating excessive number of categories or categories with very few observations for categorical parameters, (viii) skewness reducing transforms on the first predictive analysis parameters, (ix) performing transformations for modeling algorithms that are sensitive to variable scales comprising k-means or (x) extracting principal components for dimensionality reduction.

In yet another embodiment, the method further includes the step of automatically determining at least one of source schema changes or data updates on one or more second predictive analysis parameters associated with the second tenant over a period of time by comparing the second input data with a fourth input data associated with the second tenant, in order to refine the second predictive model based on the fourth input data. The second input data and the fourth input data include data images obtained from the second tenant system at different time periods.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 6A and 6B are flow diagrams that illustrate a method for scalable predictive analysis for analytics as a software service in multi-tenant environment using the analytics server of FIG. 1 according to an embodiment herein.

DETAILED DESCRIPTION

Figure 1:
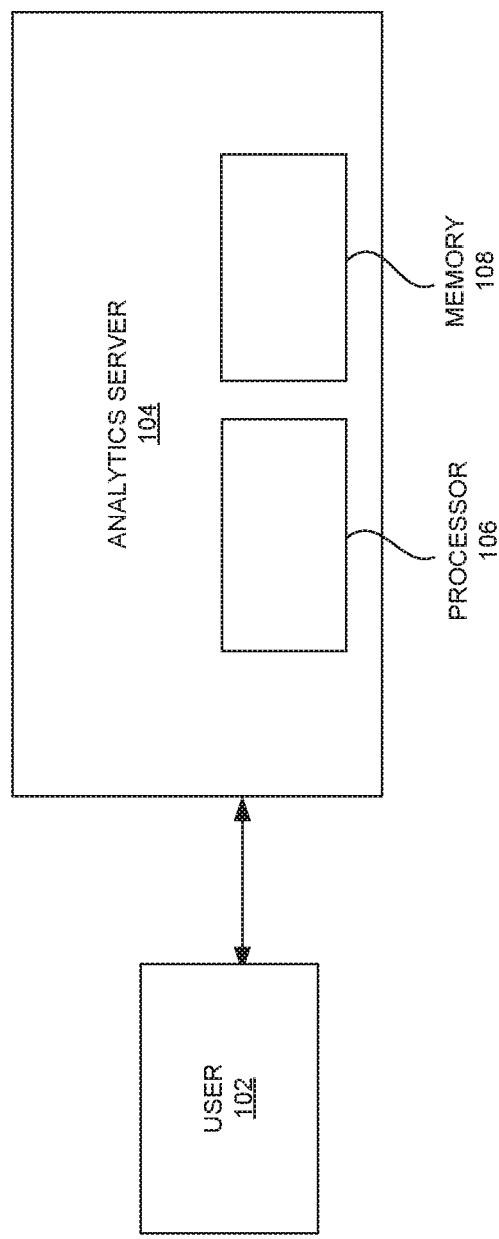
FIG. 1 is a system view illustrating a user interacting with an analytics server for a scalable predictive analysis for analytics as a software service in multi-tenant environment according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and a method for scalable predictive analysis for analytics as a software service in multi-tenant environment. Referring now to the drawings, and more particularly to FIGS. 1 through 7, where similar reference characters denote corresponding features consistently throughout the figures, preferred embodiments are shown.

As used herein, several systems and terms are defined below:

The term "datasets" refers to data records with rows and individual columns i.e. a collection of parameters or variables.

The term "distribution" refers to a statistical term for different types of numerical value distributions.

The term "metadata" refers to a data about data.

The term "data source" refers to a connection set up to a database from a server. The data source includes metadata and data.

The term "Predictive Model" refers to a collection of algorithms that are applied on datasets to predict outcomes.

The term "Predictive parameter" refers to one or more parameters that are inputs to the algorithms of the predictive model.

In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

FIG. 1 is a system view illustrating a user 102 interacting with an analytics server 104 for a scalable predictive analysis for analytics as a software service in multi-tenant environment according to an embodiment herein. The analytics server 104 further includes a memory 108 that stores a database and a set of instructions, and a processor 106 that is configured to execute the set of instructions. The analytics server 104 automatically obtains a first input data associated with a first tenant. The first input data is obtained from at least one of a first tenant system or an application provider of the first tenant. The first input data includes metadata and data associated with the first tenant. The analytics server 104 determines first predictive analysis parameters associated with the first tenant by analyzing the first input data for selected entities. In one embodiment, the first predictive analysis parameters associated with the first tenant are automatically determined by implementing an input entity analysis technique to analyze the first input data and by automatically analyzing the first input data for selected entities identified from the first input data. In another embodiment, the first input data is analyzed to (a) identify entities and their relationships based on the metadata, (b) describe use of the entities based on available documentation or (c) identify frequently used entities based on usage logs for reports and ad-hoc queries. In one embodiment, when the first input data is obtained from a downstream data source associated with the first tenant system, as opposed to a warehouse, lineage information that is available for entities and parameters is also obtained.

In an embodiment, the first input data associated with selected entities is analyzed to determine at least one of (i) a number and proportion of nulls or unspecified values for each parameter, (ii) a number and proportion of distinct values in each parameter, (iii) parameters with minimal or no variance in values, (iv) outliers for each parameters, (v) functional dependencies between the first predictive analysis parameters within and across the entities, (vi) correlations between the first predictive analysis parameters as determined using a standard statistical technique, (vii) categorical parameters with one or more category frequencies greater than a prespecified maximum percentage of observations or less than a prespecified minimum percentage of observations, (viii) a statistical distribution that matches actual parameter values along with support for under sampling or oversampling for adjustment of value distribution as required for numerical parameters, (ix) a minimum, a maximum, a median, a first quartile and a third quartile for the numerical parameters, or (x) skewness for the numerical parameters.

The analytics server 104 automatically identifies at least one of (i) parameters with more than a prespecified proportion of nulls or unspecified values, (ii) parameters with less than a prespecified proportion of distinct values, (iii) parameters with less than a prespecified variance, (iv) parameters with more than a prespecified proportion of the outliers, or (v) parameters inferable from other parameters due to functional dependencies, to be discarded, based on the analysis of the first input data. The analytics server 104 automatically filters parameters that have outliers from the first predictive analysis parameters. In one embodiment, the filtering and discarding of parameters are controlled using user defined configurable options.

The analytics server 104 automatically implements user defined rules on the first predictive analysis parameters for at least one of (i) discarding of parameters which meet user defined criterion, (ii) filtering of data values for user specified parameters, (iii) replacing of data values for the first predictive analysis parameters, (iv) standardizing the data types and type specific derivations comprising at least one of (a) hour-of-day or (b) day-of-week for datetime types or reducing scale for the numerical parameters, (v) implementing a regular expression style transformation on the first predictive analysis parameters or concatenating parameters, (vi) performing numeric transformations, (vii) consolidating excessive number of categories or categories with very few observations for categorical parameters, (viii) skewness reducing transforms on the first predictive analysis parameters, (ix) performing transformations for modeling algorithms that are sensitive to variable scales comprising k-means or (x) extracting principal components for dimensionality reduction. In one embodiment, instead of the user predefined rules, the user 102 may be allowed to perform ad-hoc actions using same constructs used to support the user defined rules.

The analytics server 104 automatically reads a first predictive model with the first predictive analysis parameters associated with the first tenant. The first predictive model that is run on a computer device is generated by creating an input dataset for machine learning algorithm based on the first predictive analysis parameters. The analytics server 104 automatically compares one or more second parameters of a second input data associated with a second tenant with the first predictive analysis parameters.

The second input data is obtained from at least one of a second tenant system or an application provider of the second tenant. The analytics server 104 automatically determines (a) one or more missing parameters, from the first predictive analysis parameters, that are missing in the second input data, (b) one or more new parameters that are present in the second input data (c) one or more parameters that are present in the first predictive analysis parameters and in the second input data, and (d) one or more parameters that are present in the second input data and are discarded from the first predictive analysis parameters, based on the comparison. In one embodiment, data associated with at least one of (i) the parameters that are present in the first predictive analysis parameters and in the second input data, and (ii) the parameters that are present in the second input data and are discarded from the first predictive analysis parameters are compared to determine whether the data distribution of the parameters has significant changes.

The analytics server 104 ports the first predictive model for the second tenant by at least one of (a) removing the one or more missing parameters, or (b) incorporating at least one of (A) the new parameters that are present in the second input data on receiving a first input from the user 102 based on results of input data analysis of the new parameters, (B) the parameters that are present in the first predictive analysis parameters and in the second input data and have significant changes on receiving a second input from the user 102, or (C) the parameters that are present in the second input data and are discarded from the first predictive analysis parameters and have significant changes on receiving a third input from the user 102, to obtain a transformed second predictive model for the second tenant. The analytics server 104 enables the second tenant to perform predictive analysis using the second predictive model.

In an embodiment, the analytics server 104 automatically compares, across one or more second predictive analysis parameters and the first predictive analysis parameters, at least one of (a) number and proportion of nulls or unspecified values for each parameter, (b) number and proportion of distinct values in each parameter, (c) parameters with minimal or no variance in values, (d) outlier distribution for each parameter, (e) functional dependencies between the one or more parameters within and across the entities, (f) correlations between the one or more parameters, (g) categorical parameters with low or high category frequencies, (h) distribution that matches the actual parameter values for the numerical parameters, (i) minimum, maximum, median, first quartile and third quartile for the numeric parameters, or (j) skewness for the numerical variables.

The analytics server 104 automatically identifies significant changes to (a) number and proportion of nulls or unspecified values for each parameter using Two Proportion Z-Test, (b) number and proportion of distinct values in each parameter using Chi-Square Test of Homogeneity, (c) parameters with minimal or no variance in values using F-test of equality of variances, (d) outlier distribution for each parameter using the Two Proportion Z-Test, (e) functional dependencies between the one or more parameters within and across the entities if any dependency change is significant, (f) correlations between the one or more parameters using Z-Test of two correlations, (g) categorical parameters with low or high category frequencies using the Chi-Square Test of Homogeneity, (h) distribution that matches the actual parameter values for the numerical parameters using Shapiro-Wilk test of normality, (i) minimum, maximum, median, first quartile and third quartile for the numeric parameters using T-Test of Two Means and Mann-Whitney Test of Two Medians and others, or (j) skewness for the numerical variables using Custom test.

In an embodiment, the analytics server 104 determines at least one of source schema changes or data updates on the one or more first predictive analysis parameters over a period of time by comparing the first input data with a third input data associated with the first tenant, to refine the first predictive model based on the third input data. In one embodiment, the first input data and the third input data include data images obtained from the first tenant system at different time periods.

In another embodiment, the source schema changes are determined by identifying at least one of (a) one or more parameters, from the first predictive analysis parameters, that are missing in the third input data, (b) one or more new parameters that are present in the third input data, (c) one or more modified parameters, or (d) one or more unchanged parameters that are present in the first input data and the third input data, based on the comparison of the first input data with the third input data. The one or more new parameters, the one or more modified parameters, and the one or more unchanged parameters from the third input data are analyzed using data analysis techniques. Data associated with at least one of the one or more modified parameters or the one or more unchanged parameters are compared to determine whether the data distribution associated with the one or more modified parameters or the one or more unchanged parameters has significant changes.

In one embodiment, the source schema changes are determined by identifying at least one of (i) significant changes to number and proportion of nulls or unspecified values for each parameter, (ii) significant changes to number and proportion of distinct values in each parameter, (iii) significant changes to variance in values of the one or more parameters, (iv) significant changes to proportion of the outliers for each parameter, (v) changes to functional dependencies between the one or more parameters within and across the entities, (vi) significant changes in correlation between the one or more parameters, (vii) significant changes to categorical parameters with high or low category frequencies, or (viii) statistically significant changes in distribution of numerical parameters include (a) nature of distribution, (b) significant changes to minimum, maximum, median, first quartile and third quartile, and (c) significant skewness changes.

In one embodiment, the data updates include changes to the distribution of the first predictive analysis parameters or relationships among the first predictive analysis parameters over a configurable time horizon.

The analytics server 104 automatically refines the first predictive model by incorporating the source schema changes and the data updates associated with the third input to obtain refined first predictive model for the first tenant. The incorporation of the source schema changes and the data updates includes at least one of (a) removing the one or more missing parameters from the first predictive analysis parameters, or (b) incorporating, in the first predictive model, at least one of (i) the one or more new parameters that are present in the third input data on receiving a fourth input from the user 102, (ii) the one or more modified parameters that have significant changes on receiving a fifth input from the user 102, or (iii) the one or more unchanged parameters that have significant changes on receiving a sixth input from the user 102.

The analytics server 104 automatically determines at least one of source schema changes or data updates on one or more second predictive analysis parameters associated with the second tenant over a period of time by comparing the second input data with a fourth input data associated with the second tenant, in order to refine the second predictive model based on the fourth input data, as described above for the first tenant. The second input data and the fourth input data include data images obtained from the second tenant system at different time periods. The first input data and the second input data include data images obtained from the first tenant system and the second tenant system respectively.

Figure 2:
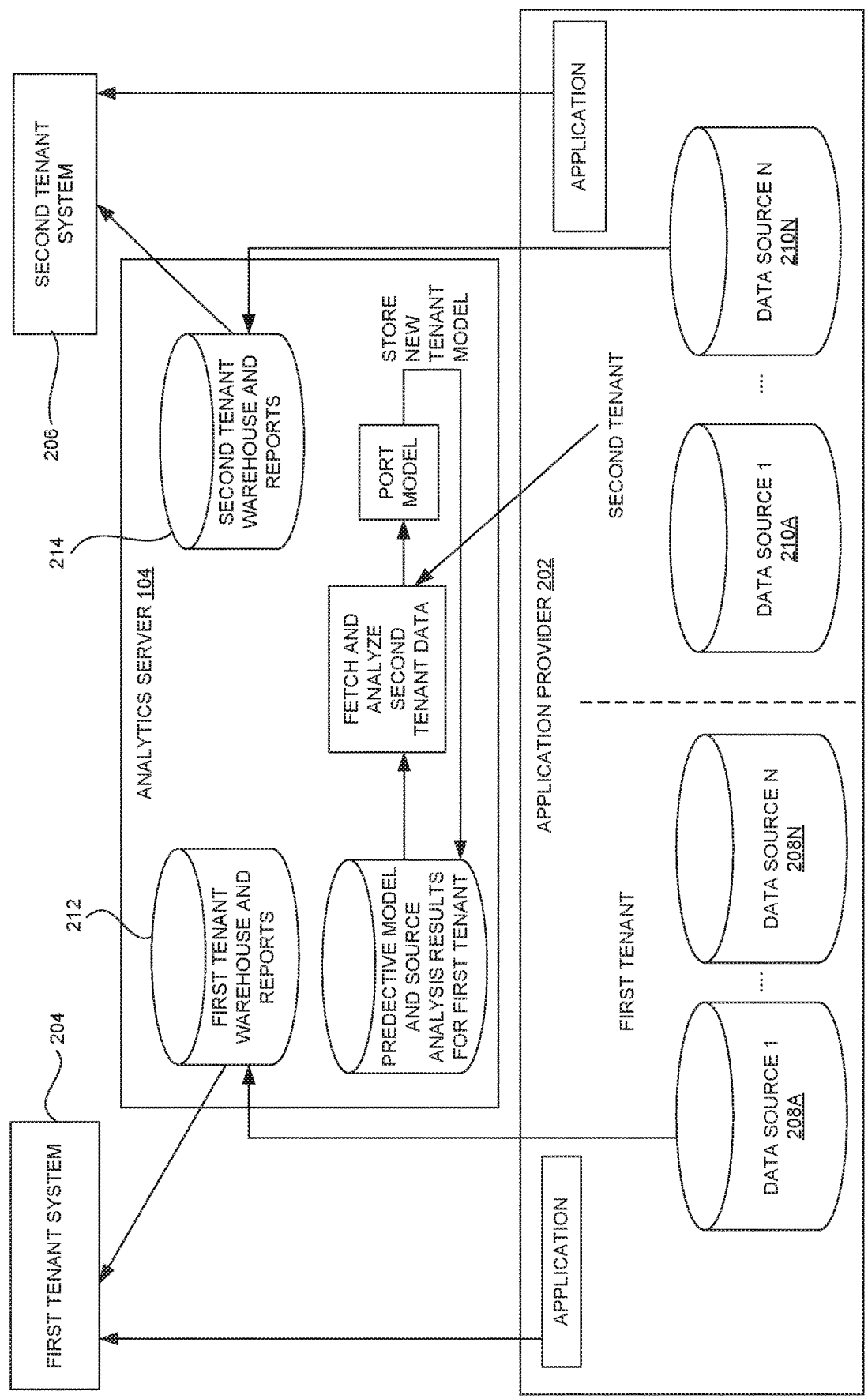
FIG. 2 illustrates a functional block diagram of a system that comprises the analytics server of FIG. 1 according to an embodiment herein.

FIG. 2 illustrates a functional block diagram of a system that comprises the analytics server 104 of FIG. 1 according to an embodiment herein. The system further includes an application provider 202, a first tenant system 204, and a second tenant system 206. The first tenant system 204 and the second tenant system 206 are communicatively connected to the application provider 202 for receiving input data associated with a first tenant and a second tenant respectively at different time periods. The application provider 202 includes one or more first data sources 208A-N that stores the input data associated with the first tenant and one or more second data sources 210A-N that stores the input data associated with the second tenant. The analytics server 104 includes a first tenant data warehouse 212 and a second tenant data warehouse 214. The first tenant data warehouse 212 obtains the input data or data images associated with the first tenant from at least one of the first tenant system 204 or the one or more first data sources 208A-N of the application provider 202. Similarly, the second tenant data warehouse 214 obtains the input data or data images associated with the second tenant from at least one of the second tenant system 206 or the one or more second data sources 210A-N of the application provider 202. The analytics server 104 fetches a first predictive model with a first predictive analysis parameters associated with the first tenant from an analytical server database and analyze it with the input data or data images associated with the second tenant. The analytics server 104 ports the first predictive model for the second tenant based on the analysis to obtain a second predictive model. The analytics server 104 then stores the second predictive model in the analytical server database. The other functions of the analytics server 104 have been described above in FIG. 1.

Figure 3:
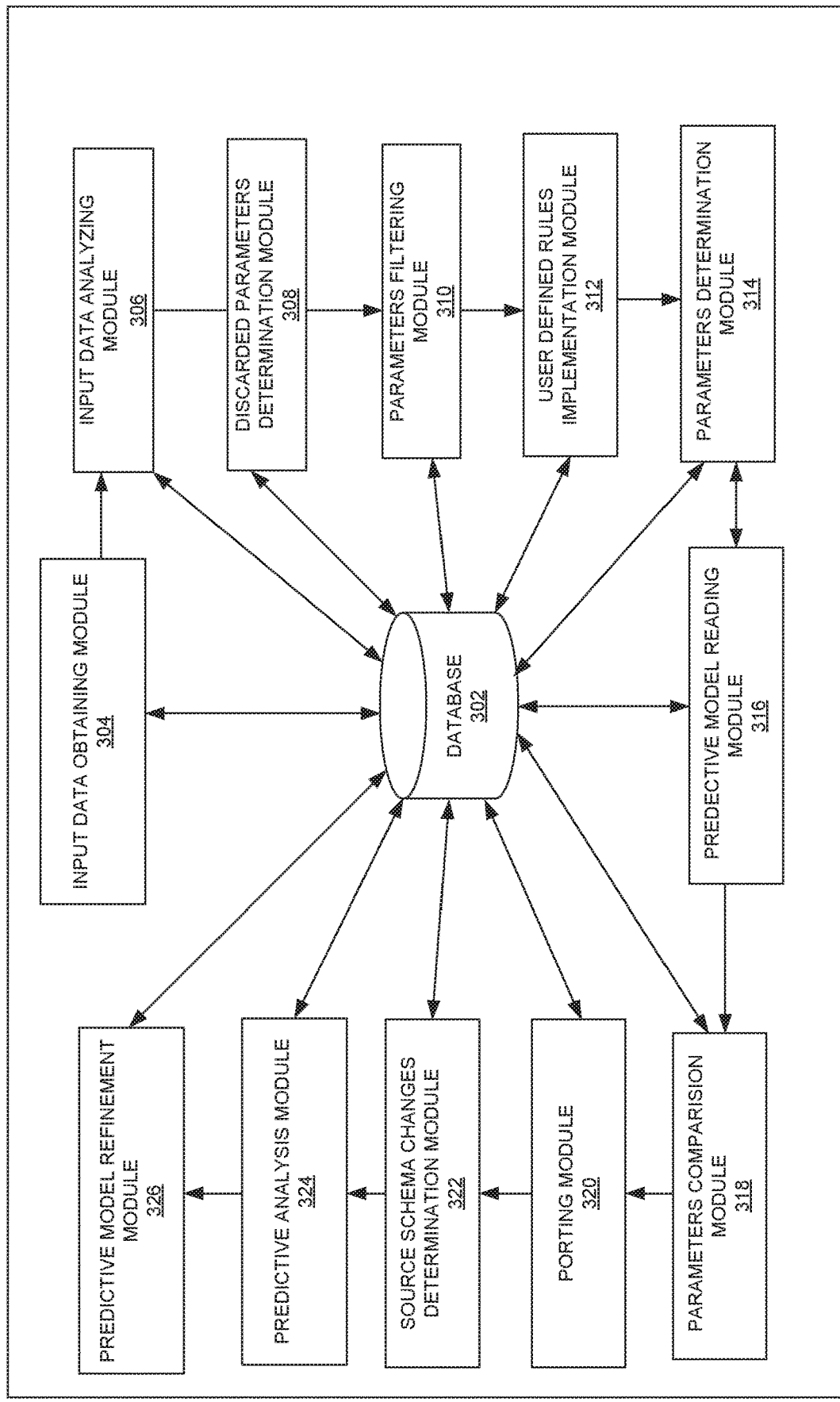
FIG. 3 illustrates an exploded view of the analytics server of FIG. 1 according to an embodiment herein.

FIG. 3 illustrates an exploded view of the analytics server 104 of FIG. 1 according to an embodiment herein. The analytics server 104 includes a database 302, an input data obtaining module 304, an input data analyzing module 306, a discarded parameters determination module 308, a parameters filtering module 310, a user defined rules implementation module 312, a parameters determination module 314, a predictive model reading module 316, a parameters comparison module 318, a porting module 320, a source schema changes determination module 322, a predictive analysis module 324, and a predictive model refinement module 326.

The input data obtaining module 304 automatically obtains a first input data associated with a first tenant. The first input data is obtained from at least one of the first tenant system 204 or the application provider 202 of the first tenant.

The parameters determination module 314 determines the first predictive analysis parameters associated with the first tenant by (i) implementing the input entity analysis technique to analyze the first input data and (ii) automatically analyzing the first input data for selected entities identified from the first input data. The first input data is analyzed to (a) identify entities and their relationships based on the metadata, (b) describe use of the entities based on the available documentation, or (c) identify frequently used entities based on the usage logs for the reports and the ad-hoc queries.

The input data analyzing module 306 analyzes the first input data associated with the selected entities by implementing input data analysis techniques to determine at least one of (i) the number and proportion of nulls or unspecified values for each parameter, (ii) the number and proportion of distinct values in each parameter, (iii) the parameters with minimal or no variance in values, (iv) the outliers for each parameters, (v) the functional dependencies between the one or more first predictive analysis parameters within and across the entities, (vi) the correlations between the one or more first predictive analysis parameters as determined using the standard statistical technique, (vii) the categorical parameters with one or more category frequencies greater than the prespecified maximum percentage of the observations or less than the prespecified minimum percentage of the observations, (viii) the statistical distribution that matches the actual parameter values along with support for under sampling or oversampling for adjustment of the value distribution as required for the numerical parameters, (ix) the minimum, the maximum, the median, the first quartile and the third quartile for the numerical parameters, or (x) the skewness for the numerical parameters.

The discarded parameters determination module 308 automatically identifies at least one of (i) the parameters with more than the prespecified proportion of nulls or the unspecified values, (ii) the parameters with less than the prespecified proportion of the distinct values, (iii) the parameters with less than the prespecified variance, (iv) the parameters with more than the prespecified proportion of the outliers, or (v) the parameters inferable from other variables due to functional dependencies, to be discarded, based on the analysis of the first input data. The parameters filtering module 310 automatically filters the parameters that have outliers from the first predictive analysis parameters.

The user defined rules implementation module 312 automatically implements user defined rules on the first predictive analysis parameters for at least one of (i) discarding of parameters which meet the user defined criterion, (ii) filtering of data values for the user specified parameters, (iii) replacing of data values for the first predictive analysis parameters, (iv) standardizing the data types and type specific derivations include at least one of (a) hour-of-day or (b) day-of-week for datetime types or reducing scale for the numerical parameters, (v) implementing the regular expression style transformation on the first predictive analysis parameters or the concatenating parameters, (vi) performing the numeric transformations, (vii) consolidating excessive number of categories or categories with very few observations for the categorical parameters, (viii) skewness reducing transforms on the first predictive analysis parameters, (ix) performing transformations for modeling algorithms that are sensitive to the variable scales include k-means, or (x) extracting the principal components for dimensionality reduction.

The predictive model reading module 316 automatically reads a first predictive model with the first predictive analysis parameters associated with the first tenant. The parameters comparison module 318 automatically compares one or more second parameters of a second input data associated with a second tenant with the first predictive analysis parameters.

The parameters determination module 314 further automatically determines (a) the one or more missing parameters, from the first predictive analysis parameters, that are missing in the second input data, (b) the one or more new parameters that are present in the second input data, (c) the one or more parameters that are present in the first predictive analysis parameters and in the second input data, and (d) the one or more parameters that are present in the second input data and are discarded from the first predictive analysis parameters, based on the comparison.

The porting module 320 ports the first predictive model for the second tenant by at least one of (a) removing the one or more missing parameters, or (b) incorporating at least one of (i) the new parameters that are present in the second input data on receiving a first input from the user 102 based on results of input data analysis of the new parameters, (ii) the parameters that are present in the first predictive analysis parameters and in the second input data and have significant changes on receiving the second input from the user 102, or (iii) the parameters that are present in the second input data and are discarded from the first predictive analysis parameters and have significant changes on receiving the third input from the user 102, to obtain the transformed second predictive model with one or more second predictive analysis parameters for the second tenant.

The source schema changes determination module 322 further automatically determines at least one of the source schema changes or the data updates on the one or more first predictive analysis parameters over the period of time by comparing the first input data with a third input data associated with the first tenant, to refine the first predictive model based on the third input data. In an embodiment, the source schema changes determination module 322 further automatically determines at least one of the source schema changes or the data updates on the one or more second predictive analysis parameters associated with the second tenant over the period of time by comparing the second input data with a fourth input data associated with the second tenant, in order to refine the second predictive model based on the fourth input data. In one embodiment, the second input data and the fourth input data include data images obtained from the second tenant system 206 at different time periods.

The predictive analysis module 324 enables the second tenant to perform predictive analysis using the second predictive model. The predictive model refinement module 326 automatically refines the first predictive model by incorporating the source schema changes and the data updates associated with the third input to obtain refined first predictive model for the first tenant. Similarly, the predictive model refinement module 326 automatically refines the second predictive model by incorporating the source schema changes and the data updates associated with the fourth input to obtain refined second predictive model for the second tenant.

Figure 4:
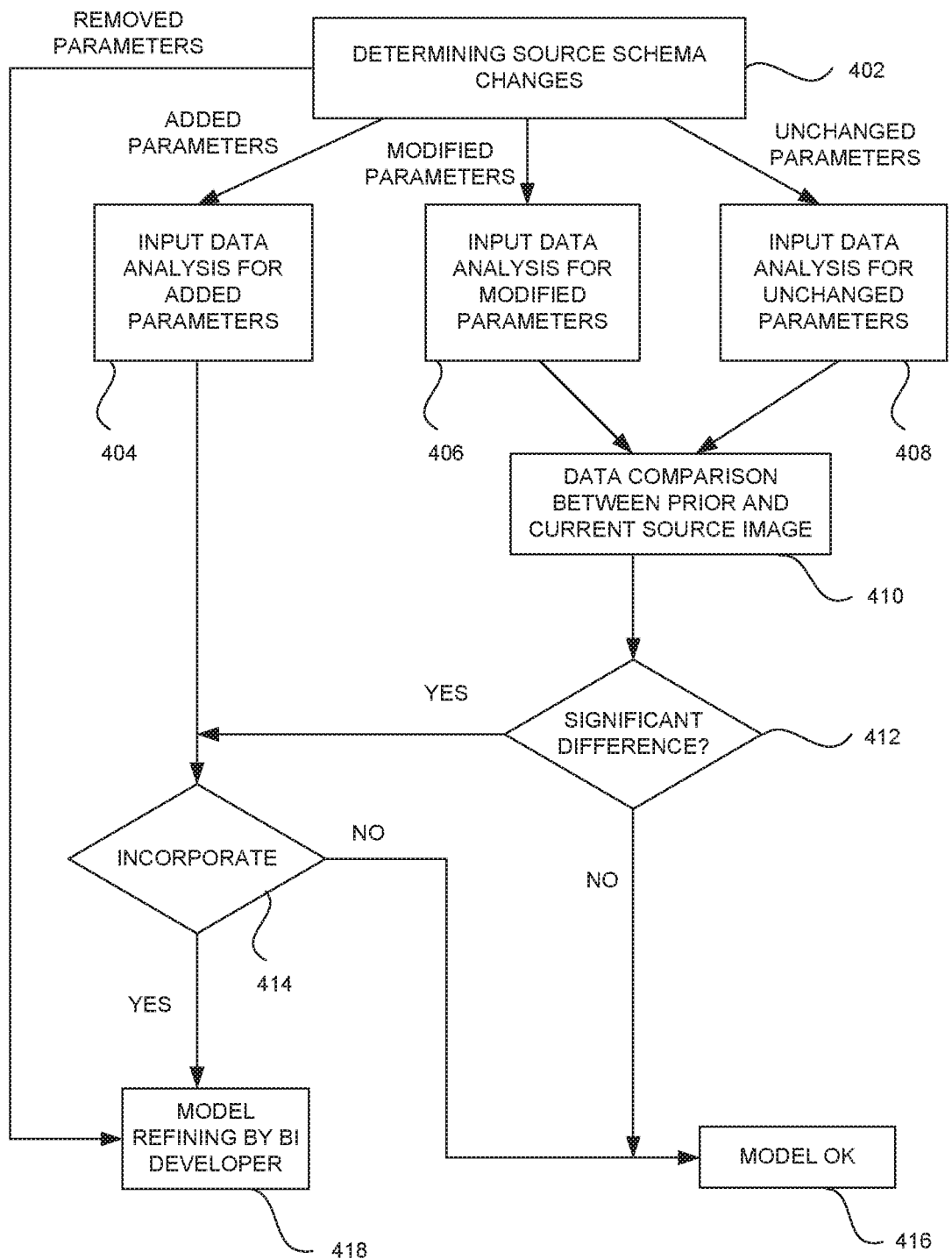
FIG. 4 is a flow chart that illustrates refinement of a predictive model by incorporating source schema changes according to an embodiment herein.

FIG. 4 is a flow chart that illustrates refinement of a predictive model by incorporating the source schema changes according to an embodiment herein. At step 402, the source schema changes are determined by comparing a first input data with a third input data associated with a tenant and by identifying at least one of (a) one or more parameters, from predictive analysis parameters of the first input data, that are missing in the third input data, (b) one or more new parameters that are present in the third input data, (c) the one or more modified parameters, or (d) one or more unchanged parameters that are present in the first input data and the third input data, based on the comparison. At step 404, the one or more new parameters from the third input data are analyzed using the data analysis techniques. At step 406, the one or more modified parameters are analyzed using the data analysis techniques. At step 408, the one or more unchanged parameters are analyzed using the data analysis techniques. At step 410, the data associated with at least one of the one or more modified parameters or the one or more unchanged parameters are compared. At step 412, it is determined whether the data distribution associated with the one or more modified parameters or the one or more unchanged parameters has significant changes. If YES, it is determined whether the source schema changes (i.e. the one or more new parameters and the one or more modified/unchanged parameters that have significant changes) associated with the third input have to be incorporated in the predictive model at step 414. If YES, at step 418, the predictive model is refined for the tenant by a business intelligence (BI) developer by incorporating the source schema changes associated with the third input. The predictive model is stored back in the database 302 without any changes, at step 416, when (a) the one or more new parameters are not to be incorporated and (b) the one or more modified/unchanged parameters have no significant changes or any significant changes in such parameters were deemed unnecessary to incorporate.

Figure 5:
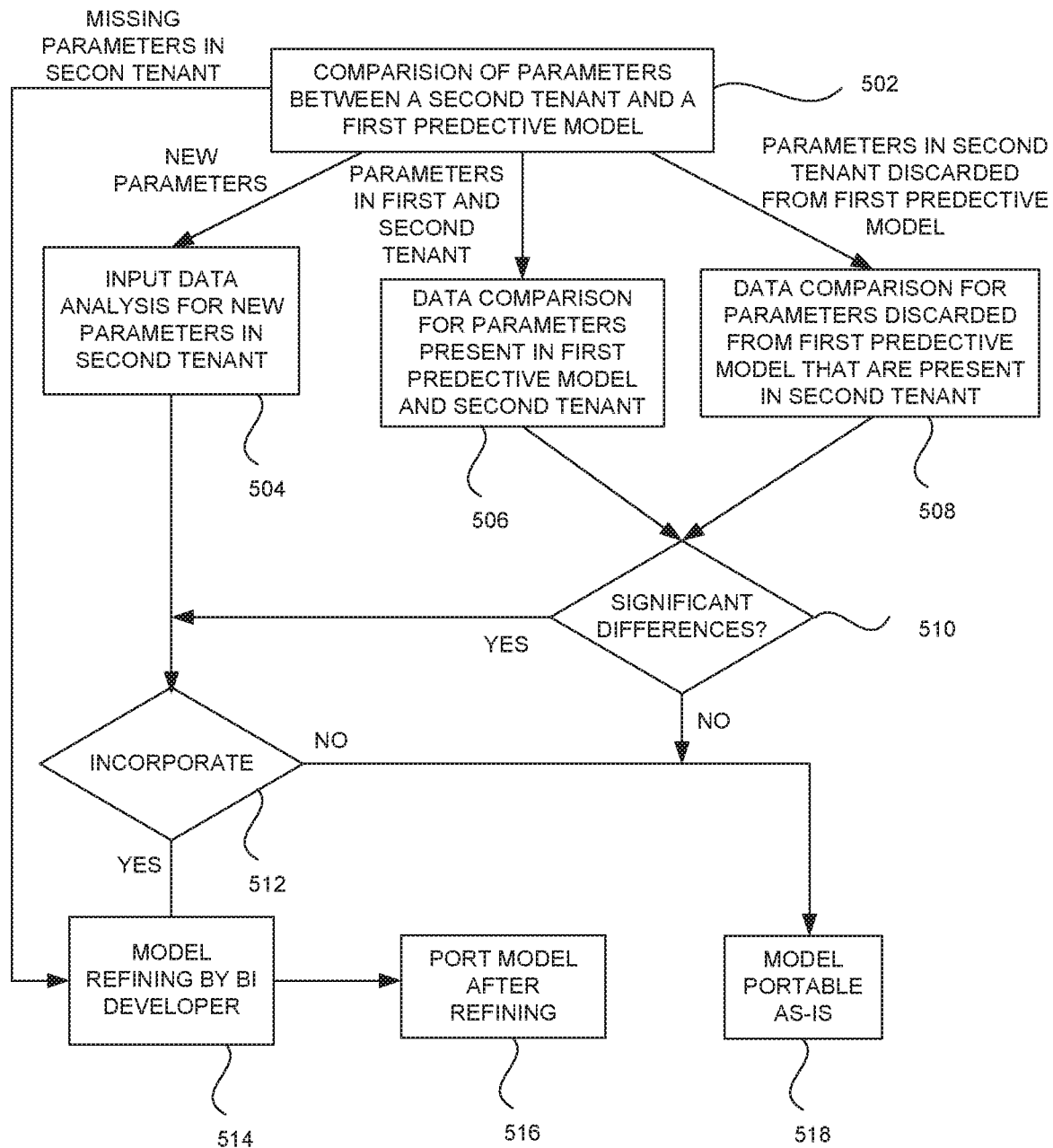
FIG. 5 is a flow chart that illustrates porting of a first predictive model associated with a first tenant for a second tenant according to an embodiment herein.

FIG. 5 is a flow chart that illustrates porting of a first predictive model associated with a first tenant for a second tenant according to an embodiment herein. At step 502, one or more second parameters associated with an input data of a second tenant are compared with first predictive analysis parameters of the first predictive model to determine (a) one or more missing parameters, from the first predictive analysis parameters, that are missing in the input data of the second tenant, (b) one or more new parameters that are present in the input data of the second tenant, (c) one or more parameters that are present in the first predictive analysis parameters and in the input data of the second tenant, and (d) one or more parameters that are present in the input data of the second tenant and are discarded from the first predictive analysis parameters.

At step 504, the one or more new parameters that are present in the input data of the second tenant are analyzed using the data analysis techniques. At step 506, data associated with the parameters that are present in the first predictive analysis parameters and in the input data of the second tenant are compared. At step 508, data associated with the parameters that are present in the input data of the second tenant and are discarded from the first predictive analysis parameters are compared.

At step 510, it is determined whether the data associated with at least one of (i) the parameters that are present in the first predictive analysis parameters and in the input data of the second tenant, and (ii) the parameters that are present in the input data of the second tenant and are discarded from the first predictive analysis parameters has significant changes. If YES, it is determined whether at least one of (i) the parameters that are present in the first predictive analysis parameters and in the input data of the second tenant and have significant changes, or (ii) the parameters that are present in the input data of the second tenant and are discarded from the first predictive analysis parameters and have significant changes, have to be incorporated in the first predictive model, at step 512. Further, at step 512, it is also determined whether the one or more new parameters that are present in the input data of the second tenant based on results of the input data analysis of the new parameters have to be incorporated in the first predictive model.

If YES, at step 514, the first predictive model is refined by a business intelligence (BI) developer by incorporating the one or more new parameters, the data updates (i.e. parameters having significant changes) associated with the input data of the second tenant and by removing the missing parameters on receiving an input from the user 102. At step 516, the refined first predictive model is ported for the second tenant based on the input data associated with the second tenant to obtain a second predictive model for the second tenant. The first predictive model is portable as it is, at step 518, when (a) the one or more new parameters are not to be incorporated, and (b) the one or more parameters have no significant changes or any significant changes in such parameters were deemed unnecessary to incorporate.

Figure 6A:
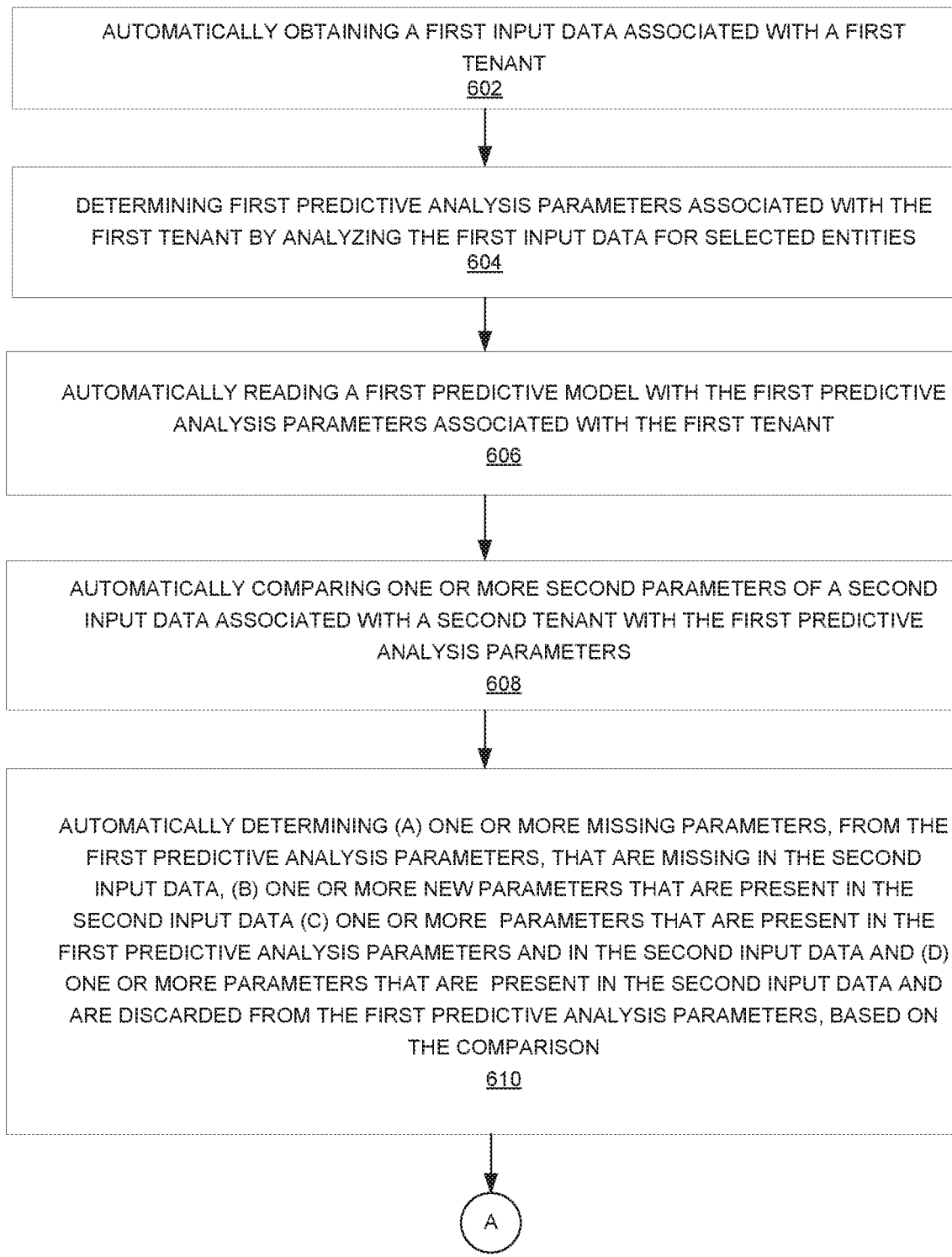

FIGS. 6A and 6B are flow diagrams that illustrate a method for scalable predictive analysis for analytics as a software service in multi-tenant environment using the analytics server 104 of FIG. 1 according to an embodiment herein. At step 602, the input data obtaining module 304 automatically obtains a first input data associated with a first tenant. At step 604, the parameters determination module 314 determines first predictive analysis parameters associated with the first tenant by analyzing the first input data for the selected entities. At step 606, the predictive model reading module 316 automatically reads a first predictive model with the first predictive analysis parameters associated with the first tenant. At step 608, the parameters comparison module 318 automatically compares one or more second parameters of a second input data associated with a second tenant with the first predictive analysis parameters.

At step 610, the parameters determination module 314 automatically determines (a) the one or more missing parameters, from the first predictive analysis parameters, that are missing in the second input data, (b) the one or more new parameters that are present in the second input data (c) the one or more parameters that are present in the first predictive analysis parameters and in the second input data and (d) the one or more parameters that are present in the second input data and are discarded from the first predictive analysis parameters, based on the comparison.

At step 612, the porting module 320 ports the first predictive model for the second tenant by at least one of (a) removing the one or more missing parameters, or (b) incorporating at least one of (i) the new parameters that are present in the second input data on receiving the first input from the user 102 based on results of the input data analysis of the new parameters, (ii) the parameters that are present in the first predictive analysis parameters and in the second input data and have significant changes on receiving the second input from the user 102, or (iii) the parameters that are present in the second input data and are discarded from the first predictive analysis parameters and have significant changes on receiving the third input from the user 102, to obtain the transformed second predictive model for the second tenant. At step 614, the predictive analysis module 324 enables the second tenant to perform predictive analysis using the second predictive model.

The embodiments herein may comprise a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
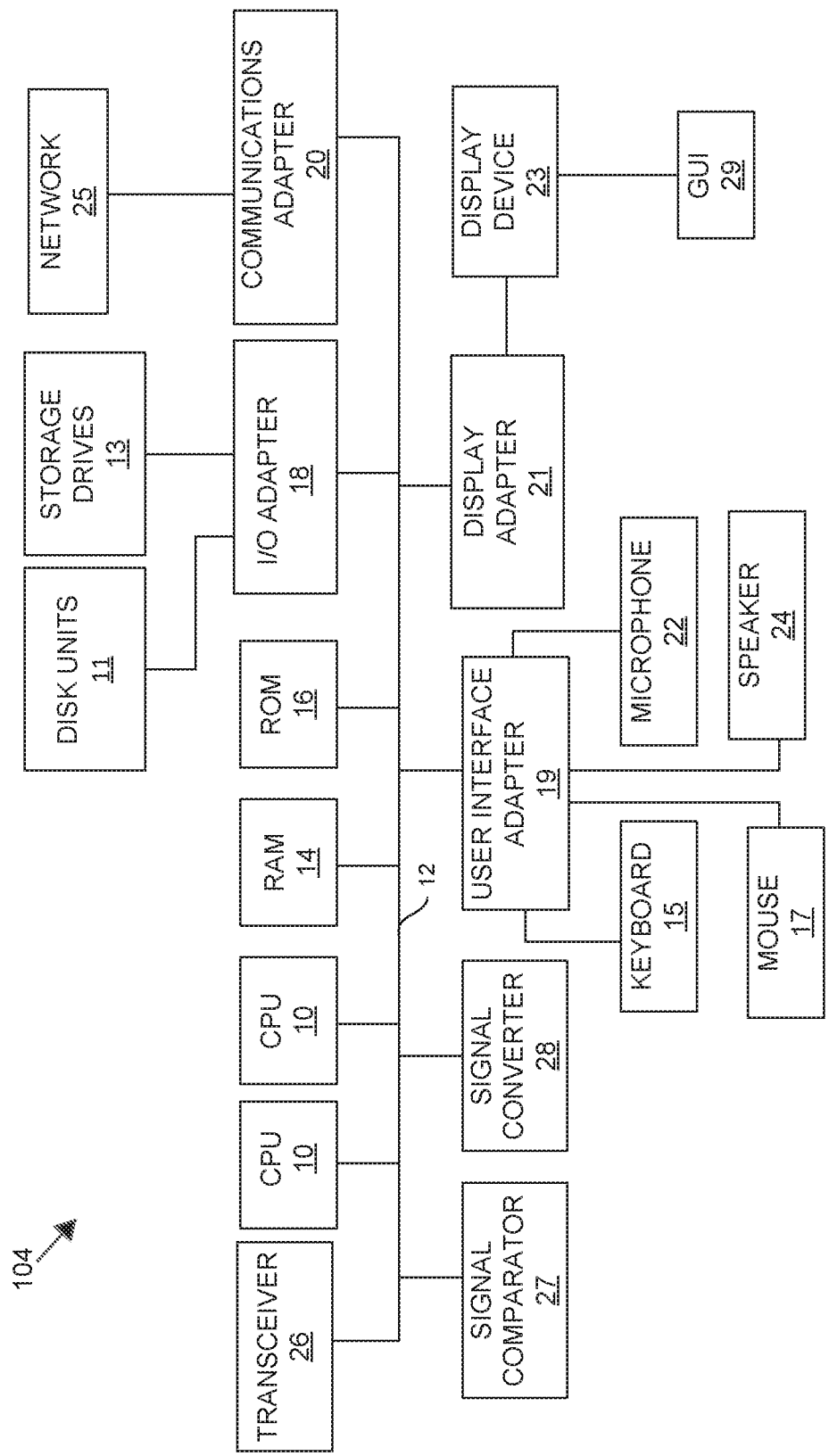
FIG. 7 is an analytics server used in accordance with the embodiments herein.

A representative hardware environment for practicing the embodiments herein is depicted in FIG. 7, with reference to FIGS. 1 through 6B. This schematic drawing illustrates a hardware configuration of an analytics server/computer system/computing device 104 in accordance with the embodiments herein. The analytics server 104 comprises at least one processing device 10. The special-purpose CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The analytics server 104 can read the inventive instructions on the program storage devices and follow these instructions to execute the methodology of the embodiments herein. The analytics server 104 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The embodiments herein enhance the functionality of the analytics server 104 in several ways. For example, the embodiments herein make the porting of predictive models developed for one tenant to other tenants more efficient by providing a set of automated steps to compare the value distribution of the predictive model parameters, thereby reducing the processing time and effort required by the server 104 to perform its functions. Moreover, the embodiments herein make the detection of relevant source changes impacting the predictive models for a tenant easier by providing a set of automated steps to compare the value distribution of predictive model parameters at different points in time. Not only that, the embodiments herein precisely specify the testing process for both establishing source changes impacting the predictive model parameters and establishing parameter differences when porting a predictive model developed for one tenant to another. Furthermore, the embodiments herein streamline and make efficient the process of developing a predictive model using the analytics server 104 by providing automated steps for input source analysis, automated data analysis for variables of selected entities with graphical visualization of the analysis results, automatic discarding of irrelevant variables, automatic filtering of spurious variable values and automatic enforcement of user defined rules. The capabilities added by the embodiments herein to the analytics server 104 for developing a predictive model may be used in conjunction with any known feature selection algorithms so are enhancements over existing solutions. The embodiments herein also specify the specific tests for data analysis of input variables and for each input data analysis technique, specify the set of tests to be used to determine which of the changes are "significant" compared to prior values. The specific conditions to be tested for discarding irrelevant variables and filtering spurious values are enumerated as well. The computational complexity of analyzing parameter value distributions and performing tests to determine significant changes when comparing parameters across tenants or significant parameter changes due to source changes are well beyond human capabilities as are the enforcement of user defined rules, discarding of irrelevant variables and spurious variable values and application of the process to determine relevant source changes impacting a model and porting predictive models across tenants when applied on a large scale (across multiple tenants and over long periods of time with constant changes at the source) and can only be performed by the analytics server 104 enhanced with the capabilities added in accordance with the descriptions provided by the embodiments herein.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An analytics server for scalable predictive analysis for analytics as a software service in multi-tenant environment, the analytics server comprising:
    a memory that stores a set of instructions; and
    a processor that executes the set of instructions and is configured to:
        automatically obtain a first input data associated with a first tenant, wherein the first input data is obtained from at least one of a first tenant system or an application provider of the first tenant, wherein the first input data comprise metadata and data associated with the first tenant;
        determine first predictive analysis parameters associated with the first tenant by analyzing the first input data for selected entities;
        automatically read a computer-generated first predictive model with the first predictive analysis parameters associated with the first tenant, wherein the computer-generated first predictive model that is run on a computer is generated by creating an input dataset for machine learning algorithm based on the first predictive analysis parameters; and
        automatically compare one or more second parameters of a second input data associated with a second tenant with the first predictive analysis parameters, wherein the second input data is obtained from at least one of a second tenant system or an application provider of the second tenant to:
            automatically determine (a) one or more missing parameters, from the first predictive analysis parameters, that are missing in the second input data, (b) one or more new parameters that are present in the second input data (c) one or more parameters that are present in the first predictive analysis parameters and in the second input data, and (d) one or more parameters that are present in the second input data and are discarded from the first predictive analysis parameters, based on the comparison, wherein data associated with at least one of (i) the parameters that are present in the first predictive analysis parameters and in the second input data, and (ii) the parameters that are present in the second input data and are discarded from the first predictive analysis parameters are compared to determine whether the data distribution of the parameters has significant changes;
            port the computer-generated first predictive model for the second tenant by at least one of (a) removing the one or more missing parameters, or (b) incorporating at least one of (i) the new parameters that are present in the second input data on receiving a first input from a user based on results of input data analysis of the new parameters, (ii) the parameters that are present in the first predictive analysis parameters and in the second input data and have significant changes on receiving a second input from the user, or (iii) the parameters that are present in the second input data and are discarded from the first predictive analysis parameters and have significant changes on receiving a third input from the user, to obtain a transformed second predictive model for the second tenant; and
            enable the second tenant to perform predictive analysis using the second predictive model.

2. The analytics server of claim 1, wherein said processor is further configured to automatically determine at least one of source schema changes or data updates on the one or more first predictive analysis parameters over a period of time by comparing the first input data with a third input data associated with the first tenant, to refine the computer-generated first predictive model based on the third input data.

3. The analytics server of claim 2, wherein said source schema changes are determined by identifying at least one of (a) one or more parameters, from the first predictive analysis parameters, that are missing in the third input data, (b) one or more new parameters that are present in the third input data, (c) one or more modified parameters, or (d) one or more unchanged parameters that are present in the first input data and the third input data, based on the comparison of the first input data with the third input data, wherein the one or more new parameters, the one or more modified parameters and the one or more unchanged parameters from the third input data are analyzed using data analysis techniques, wherein data associated with at least one of the one or more modified parameters or the one or more unchanged parameters are compared to determine whether the data distribution associated with the one or more modified parameters or the one or more unchanged parameters has significant changes.

4. The analytics server of claim 3, wherein the data updates comprise changes to distribution of the first predictive analysis parameters or relationships among the first predictive analysis parameters over a configurable time horizon.

5. The analytics server of claim 4, wherein said processor is configured to automatically refine the computer-generated first predictive model by incorporating the source schema changes and the data updates associated with the third input to obtain refined first predictive model for the first tenant, wherein said incorporating of the source schema changes and the data updates comprises at least one of (a) removing the one or more missing parameters from the first predictive analysis parameters, or (b) incorporating, in the computer-generated first predictive model, at least one of (i) the one or more new parameters that are present in the third input data on receiving a fourth input from the user, (ii) the one or more modified parameters that have significant changes on receiving a fifth input from said user, or (iii) the one or more unchanged parameters that have significant changes on receiving a sixth input from said user.

6. The analytics server of claim 2, wherein the first input data and the third input data comprise data images obtained from the first tenant system at different time periods.

7. The analytics server of claim 1, wherein the first input data and the second input data comprise data images obtained from the first tenant system and the second tenant system respectively.

8. The analytics server of claim 1, wherein the first predictive analysis parameters associated with the first tenant are automatically determined by (i) implementing an input entity analysis technique to analyze the first input data, wherein the first input data is analyzed to (a) identify entities and their relationships based on the metadata, (b) describe use of said entities based on available documentation, or (c) identify frequently used entities based on usage logs for reports and ad-hoc queries, and (ii) automatically analyzing the first input data for selected entities identified from the first input data.

9. The analytics server of claim 8, wherein the first predictive analysis parameters are determined by:
  implementing input data analysis techniques to analyze the first input data associated with selected entities to determine at least one of (i) a number and proportion of nulls or unspecified values for each parameter, (ii) a number and proportion of distinct values in each parameter, (iii) parameters with minimal or no variance in values, (iv) outliers for each parameters, (v) functional dependencies between said one or more first predictive analysis parameters within and across said entities, (vi) correlations between said one or more first predictive analysis parameters as determined using a standard statistical technique, (vii) categorical parameters with one or more category frequencies greater than a prespecified maximum percentage of observations or less than a prespecified minimum percentage of observations, (viii) a statistical distribution that matches actual parameter values along with support for under sampling or oversampling for adjustment of value distribution as required for numerical parameters, (ix) a minimum, a maximum, a median, a first quartile and a third quartile for said numerical parameters, or (x) skewness for said numerical parameters;
  automatically filtering parameters that have outliers from the first predictive analysis parameters; and
  automatically implementing user defined rules on the first predictive analysis parameters for at least one of (i) discarding of parameters which meet user defined criterion, (ii) filtering of data values for user specified parameters, (iii) replacing of data values for the first predictive analysis parameters, (iv) standardizing said data types and type specific derivations comprising at least one of (a) hour-of-day or (b) day-of-week for datetime types or reducing scale for said numerical parameters, (v) implementing a regular expression style transformation on the first predictive analysis parameters or concatenating parameters, (vi) performing numeric transformations, (vii) consolidating excessive number of categories or categories with very few observations for categorical parameters, (viii) skewness reducing transforms on the first predictive analysis parameters, (ix) performing transformations for modeling algorithms that are sensitive to variable scales comprising k-means, or (x) extracting principal components for dimensionality reduction.

10. The analytics server of claim 1, wherein said processor is further configured to automatically determine at least one of source schema changes or data updates on one or more second predictive analysis parameters associated with the second tenant over a period of time by comparing the second input data with a fourth input data associated with the second tenant, in order to refine the second predictive model based on the fourth input data, wherein the second input data and the fourth input data comprise data images obtained from the second tenant system at different time periods.

11. A non-transitory computer readable storage medium storing a sequence of instructions, which when executed by a processor, causes scalable predictive analysis for analytics as a software service in multi-tenant environment, said sequence of instructions comprising:
  automatically obtaining a first input data associated with a first tenant, wherein the first input data is obtained from at least one of a first tenant system or an application provider of the first tenant, wherein the first input data comprise metadata and data associated with the first tenant;
  determining first predictive analysis parameters associated with the first tenant by analyzing the first input data for selected entities;
  automatically reading a computer-generated first predictive model with the first predictive analysis parameters associated with the first tenant, wherein the first predictive model that is run on a computer is generated by creating an input dataset for machine learning algorithm based on the first predictive analysis parameters; and
  automatically comparing one or more second parameters of a second input data associated with a second tenant with the first predictive analysis parameters, wherein the second input data is obtained from at least one of a second tenant system or an application provider of the second tenant to:
    automatically determine (a) one or more missing parameters, from the first predictive analysis parameters, that are missing in the second input data, (b) one or more new parameters that are present in the second input data, (c) one or more parameters that are present in the first predictive analysis parameters and in the second input data, and (d) one or more parameters that are present in the second input data and are discarded from the first predictive analysis parameters, based on the comparison, wherein data associated with at least one of (i) the parameters that are present in the first predictive analysis parameters and in the second input data, and (ii) the parameters that are present in the second input data and are discarded from the first predictive analysis parameters are compared to determine whether the data distribution of the parameters has significant changes;
port the computer-generated first predictive model for the second tenant by at least one of (a) removing the one or more missing parameters, or (b) incorporating at least one of (i) the new parameters that are present in the second input data on receiving a first input from a user based on results of input data analysis of the new parameters, (ii) the parameters that are present in the first predictive analysis parameters and in the second input data and have significant changes on receiving a second input from the user, or (iii) the parameters that are present in the second input data and are discarded from the first predictive analysis parameters and have significant changes on receiving a third input from the user, to obtain a transformed second predictive model for the second tenant; and
enable the second tenant to perform predictive analysis using the second predictive model.

12. The non-transitory computer readable storage medium storing the sequence of instructions of claim 11, which when executed by said processor, further causes automatic determination of at least one of source schema changes or data updates on the one or more first predictive analysis parameters over a period of time by comparing the first input data with a third input data associated with the first tenant, to refine the computer-generated first predictive model based on the third input data.

13. The non-transitory computer readable storage medium storing the sequence of instructions of claim 12, wherein said source schema changes are determined by identifying at least one of (a) one or more parameters, from the first predictive analysis parameters, that are missing in the third input data, (b) one or more new parameters that are present in the third input data, (c) one or more modified parameters, or (d) one or more unchanged parameters that are present in the first input data and the third input data, based on the comparison of the first input data with the third input data, wherein the one or more new parameters, the one or more modified parameters and the one or more unchanged parameters from the third input data are analyzed using data analysis techniques, wherein data associated with at least one of the one or more modified parameters or the one or more unchanged parameters are compared to determine whether the data distribution associated with the one or more modified parameters or the one or more unchanged parameters has significant changes.

14. The non-transitory computer readable storage medium storing the sequence of instructions of claim 13, wherein the data updates comprise changes to distribution of the first predictive analysis parameters or relationships among the first predictive analysis parameters over a configurable time horizon.

15. The non-transitory computer readable storage medium storing the sequence of instructions of claim 14, which when executed by said processor, further causes automatic refinement of the computer-generated first predictive model by incorporating the source schema changes and the data updates associated with the third input to obtain refined first predictive model for the first tenant, wherein said incorporating of the source schema changes and the data updates comprises at least one of (a) removing the one or more missing parameters from the first predictive analysis parameters, or (b) incorporating, in the computer-generated first predictive model, at least one of (i) the one or more new parameters that are present in the third input data on receiving a fourth input from the user, (ii) the one or more modified parameters that have significant changes on receiving a fifth input from said user, or (iii) the one or more unchanged parameters that have significant changes on receiving a sixth input from said user.

16. The non-transitory computer readable storage medium storing the sequence of instructions of claim of claim 11, wherein the first input data and the second input data comprise data images obtained from the first tenant system and the second tenant system respectively.

17. The non-transitory computer readable storage medium storing the sequence of instructions of claim of claim 12, wherein the first input data and the third input data comprise data images obtained from the first tenant system at different time periods.

18. The non-transitory computer readable storage medium storing the sequence of instructions of claim of claim 11, wherein the first predictive analysis parameters associated with the first tenant are automatically determined by (i) implementing an input entity analysis technique to analyze the first input data, wherein the first input data is analyzed to (a) identify entities and their relationships based on the metadata, (b) describe use of said entities based on available documentation, or (c) identify frequently used entities based on usage logs for reports and ad-hoc queries, and (ii) automatically analyzing the first input data for selected entities identified from the first input data.

19. The non-transitory computer readable storage medium storing the sequence of instructions of claim of claim 18, wherein the first predictive analysis parameters are determined by:
implementing input data analysis techniques to analyze the first input data associated with selected entities to determine at least one of (i) a number and proportion of nulls or unspecified values for each parameter, (ii) a number and proportion of distinct values in each parameter, (iii) parameters with minimal or no variance in values, (iv) outliers for each parameters, (v) functional dependencies between said one or more first predictive analysis parameters within and across said entities, (vi) correlations between said one or more first predictive analysis parameters as determined using a standard statistical technique, (vii) categorical parameters with one or more category frequencies greater than a prespecified maximum percentage of observations or less than a prespecified minimum percentage of observations, (viii) a statistical distribution that matches actual parameter values along with support for under sampling or oversampling for adjustment of value distribution as required for numerical parameters, (ix) a minimum, a maximum, a median, a first quartile and a third quartile for said numerical parameters, or (x) skewness for said numerical parameters;
automatically filtering parameters that have outliers from the first predictive analysis parameters; and
automatically implementing user defined rules on the first predictive analysis parameters for at least one of (i) discarding of parameters which meet user defined criterion, (ii) filtering of data values for user specified parameters, (iii) replacing of data values for the first predictive analysis parameters, (iv) standardizing said data types and type specific derivations comprising at least one of (a) hour-of-day or (b) day-of-week for datetime types or reducing scale for said numerical parameters, (v) implementing a regular expression style transformation on the first predictive analysis parameters or concatenating parameters, (vi) performing numeric transformations, (vii) consolidating excessive number of categories or categories with very few observations for categorical parameters, (viii) skewness reducing transforms on the first predictive analysis parameters, (ix) performing transformations for modeling algorithms that are sensitive to variable scales comprising k-means, or (x) extracting principal components for dimensionality reduction.

20. The non-transitory computer readable storage medium storing the sequence of instructions of claim of claim 11, which when executed by said processor, further causes automatic determination of at least one of source schema changes or data updates on one or more second predictive analysis parameters associated with the second tenant over a period of time by comparing the second input data with a fourth input data associated with the second tenant, in order to refine the second predictive model based on the fourth input data, wherein the second input data and the fourth input data comprise data images obtained from the second tenant system at different time periods.

* * * * *